March 15, 1949.  E. B. THOMPSON  2,464,731
FLOOR PIT COVER MEANS FOR VEHICLE HOISTS
Filed Dec. 6, 1945  4 Sheets-Sheet 1

Inventor
Elmer B. Thompson
By Rudolph L. Lowell
Attorney

March 15, 1949.  E. B. THOMPSON  2,464,731
FLOOR PIT COVER MEANS FOR VEHICLE HOISTS
Filed Dec. 6, 1945  4 Sheets-Sheet 2

Inventor
Elmer B. Thompson
By Rudolph L. Lowell
Attorney

March 15, 1949.  E. B. THOMPSON  2,464,731
FLOOR PIT COVER MEANS FOR VEHICLE HOISTS
Filed Dec. 6, 1945  4 Sheets-Sheet 3
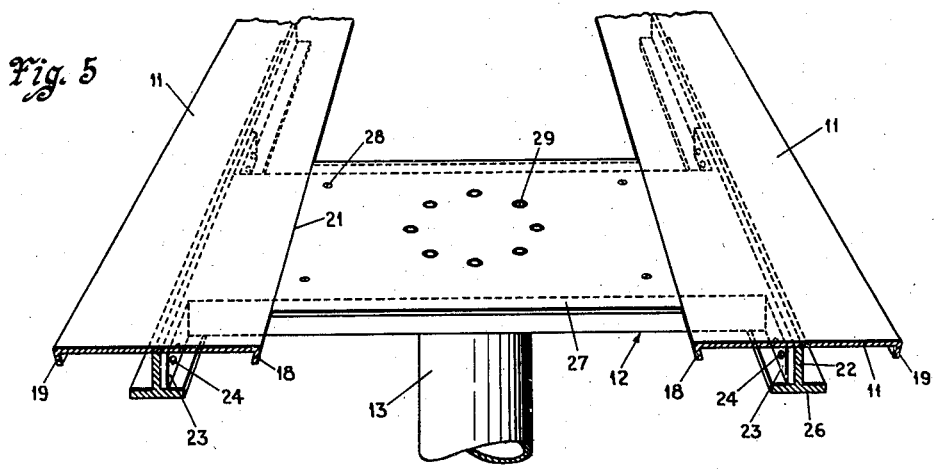
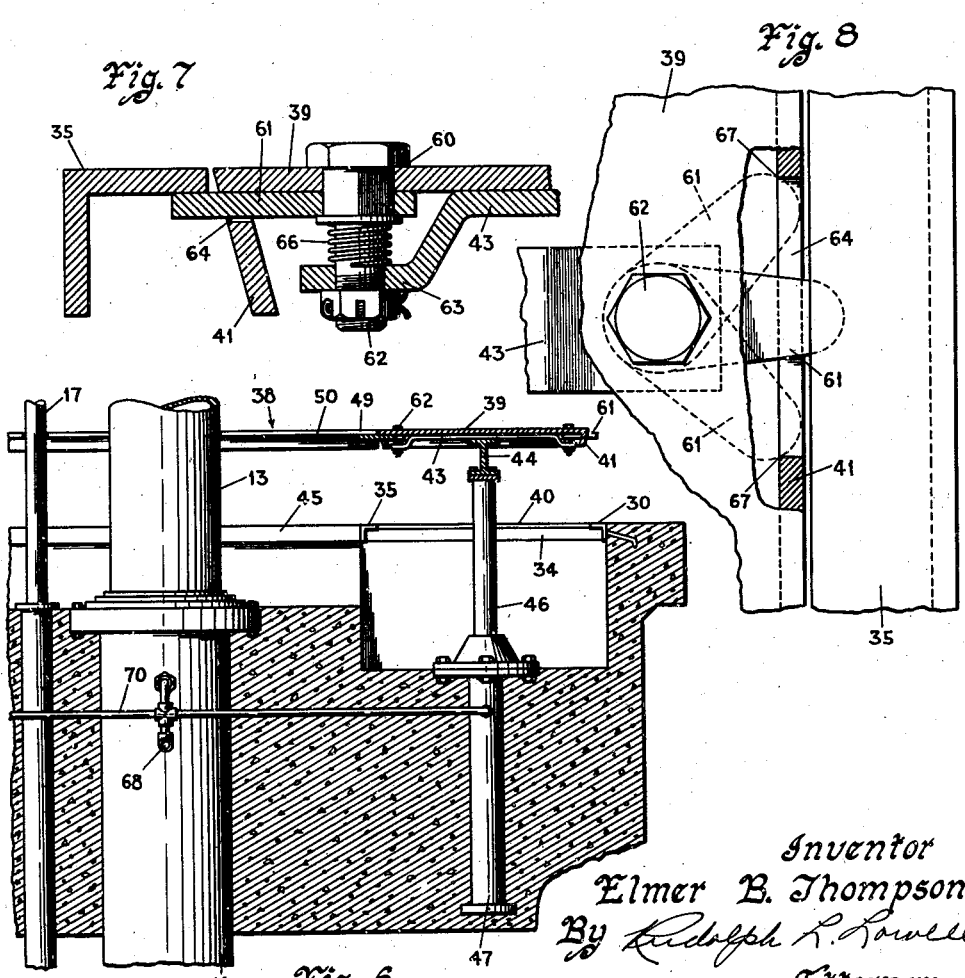
Inventor
Elmer B. Thompson
By Rudolph L. Lowell
Attorney March 15, 1949. E. B. THOMPSON 2,464,731
FLOOR PIT COVER MEANS FOR VEHICLE HOISTS
Filed Dec. 6, 1945 4 Sheets-Sheet 4
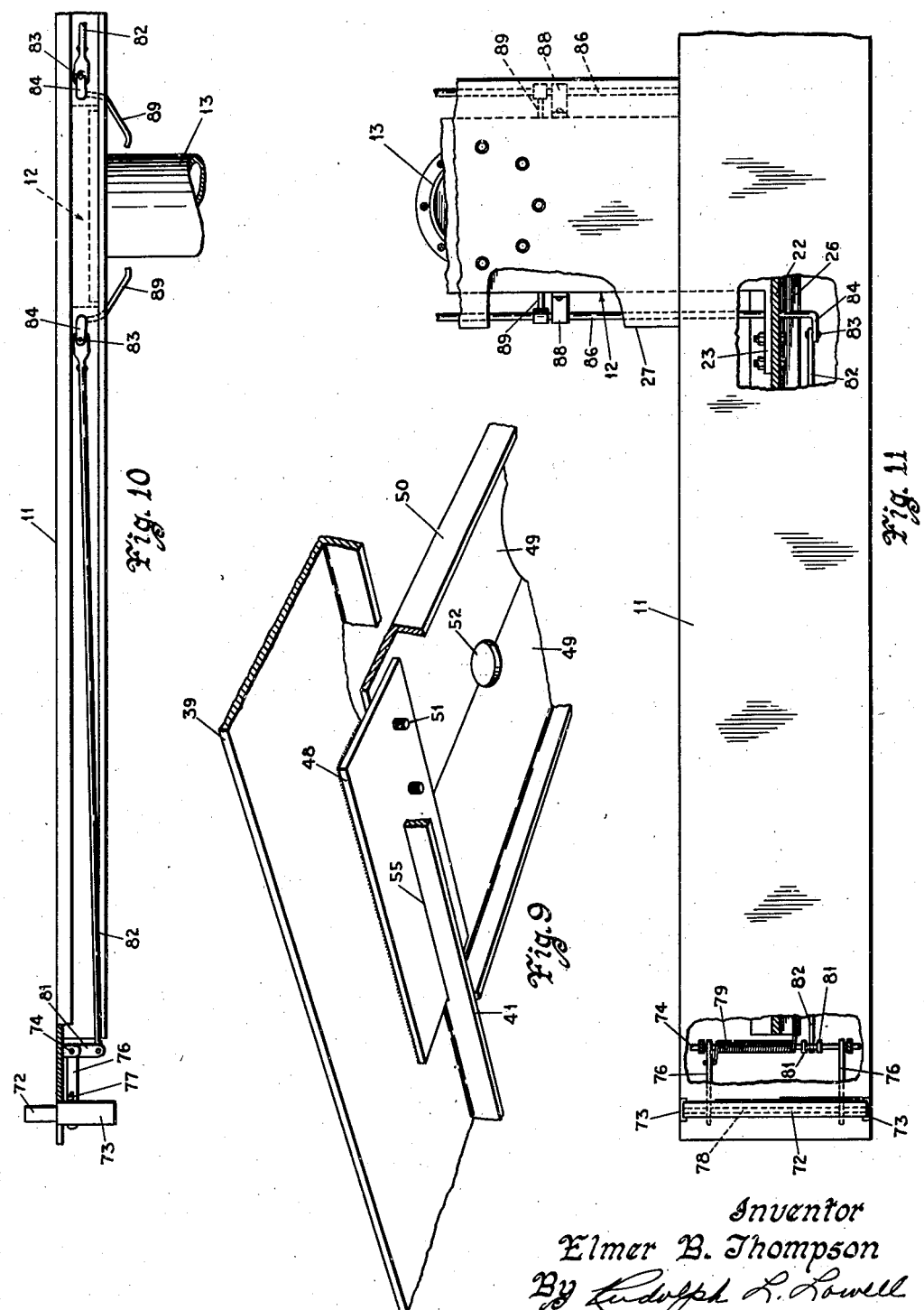
Inventor
Elmer B. Thompson
By Rudolph L. Lowell
Attorney Patented Mar. 15, 1949

2,464,731

UNITED STATES PATENT OFFICE 2,464,731

FLOOR PIT COVER MEANS FOR VEHICLE HOISTS

Elmer B. Thompson, Des Moines, Iowa, assignor to Globe Hoist Company, Des Moines, Iowa, a corporation of Iowa Application December 6, 1945, Serial No. 633,241

5 Claims. (Cl. 254—89)

This invention relates generally to vehicle hoists and in particular to a hoist adapted to be lowered within a floor pit to a floor level position covering the pit, and provided with a cover unit capable of covering the floor pit when the hoist is in a raised position.

Hoists of roll-on type are well known and generally include a substantially H-shaped lift frame having a pair of longitudinally extended transversely spaced wheel rails connected together intermediate their ends by a transverse saddle or frame member, which is mounted on a single lift piston for the hoist. In a lowered position of the hoist the H frame usually has its lower side resting on the floor surface so that the entire frame is above the level of the floor. As a result, the floor space occupied by the hoist is always obstructed by the hoist so that, even in a lowered position of the hoist, automobiles, wheel dollies and the like must be steered around the hoist. The position of the H-frame on the floor is also objectionable in that garage workmen must always exercise caution to avoid tripping over the frame and injuring themselves.

It is an object of this invention, therefore, to provide an improved vehicle hoist.

Another object of this invention is to provide a vehicle hoist of roll-on type which, when lowered into a floor pit to a substantially floor level position, has the wheel rails and the connecting member therebetween adapted to cover the floor pit.

A further object of this invention is to provide a vehicle hoist adapted to be mounted in a floor pit, in which the top side of the hoist, when the hoist is in a lowered position, is at a substantially floor level position and constitutes a cover for the floor pit, and in which a cover unit, located in the pit, is movable upwardly to cover the pit as the hoist is raised.

A still further object of this invention is to provide for the floor space occupied by a vehicle hoist of roll-on type being free of any obstructions, and adapted for normal use when the hoist is in either a lowered position or a raised position.

A feature of this invention is found in the provision of a vehicle hoist of roll-on type having a substantially H-shaped lift frame and a piston mounted in a floor pit, and movable to a lowered position at which the top side of the lift frame is in a pit-covering floor-level position. Within the pit is a movable cover unit carried on lift pistons and corresponding in size and shape to the H lift frame, but of a lighter weight than the lift frame. The pistons for the H frame and for the cover unit are concurrently operated to provide for the cover unit being raised to a pit covering position when the hoist is raised, and to a lowered position below the H frame when the frame is at its floor level position. Stop means for defining the raised position of the cover unit, are manually movable from a stop position to provide for the upward movement of the cover unit above a floor level position to permit free access into the pit for pit-cleaning and hoist servicing purposes.

Further objects, features and advantages of this invention will become apparent from the following description when taken in connection with the accompanying drawings in which:

Fig. 5 is a perspective view of the piston head unit showing its assembly relation with the wheel rails;

Fig. 6 is a fragmentary transverse sectional view of the hoist illustrated similarly to Fig. 3, and showing the pit cover unit in a raised position above the level of the floor;

Fig. 7 is a detail sectional view of the stop means for limiting the upward movement of the pit cover unit;

Fig. 8 is a detail fragmentary plan view showing the stop means in Fig. 7 in a moved position;

Fig. 9 is a detail perspective view of the cover unit for closing the floor pit when the hoist is in a raised position;

Fig. 10 is a detail fragmentary side elevational view of the hoist showing a wheel chock in assembly on the hoist; and Fig. 11 is a detail fragmentary plan view of the hoist with certain parts broken away to show the assembly therewith of the wheel chock.

Figures 1, 2:
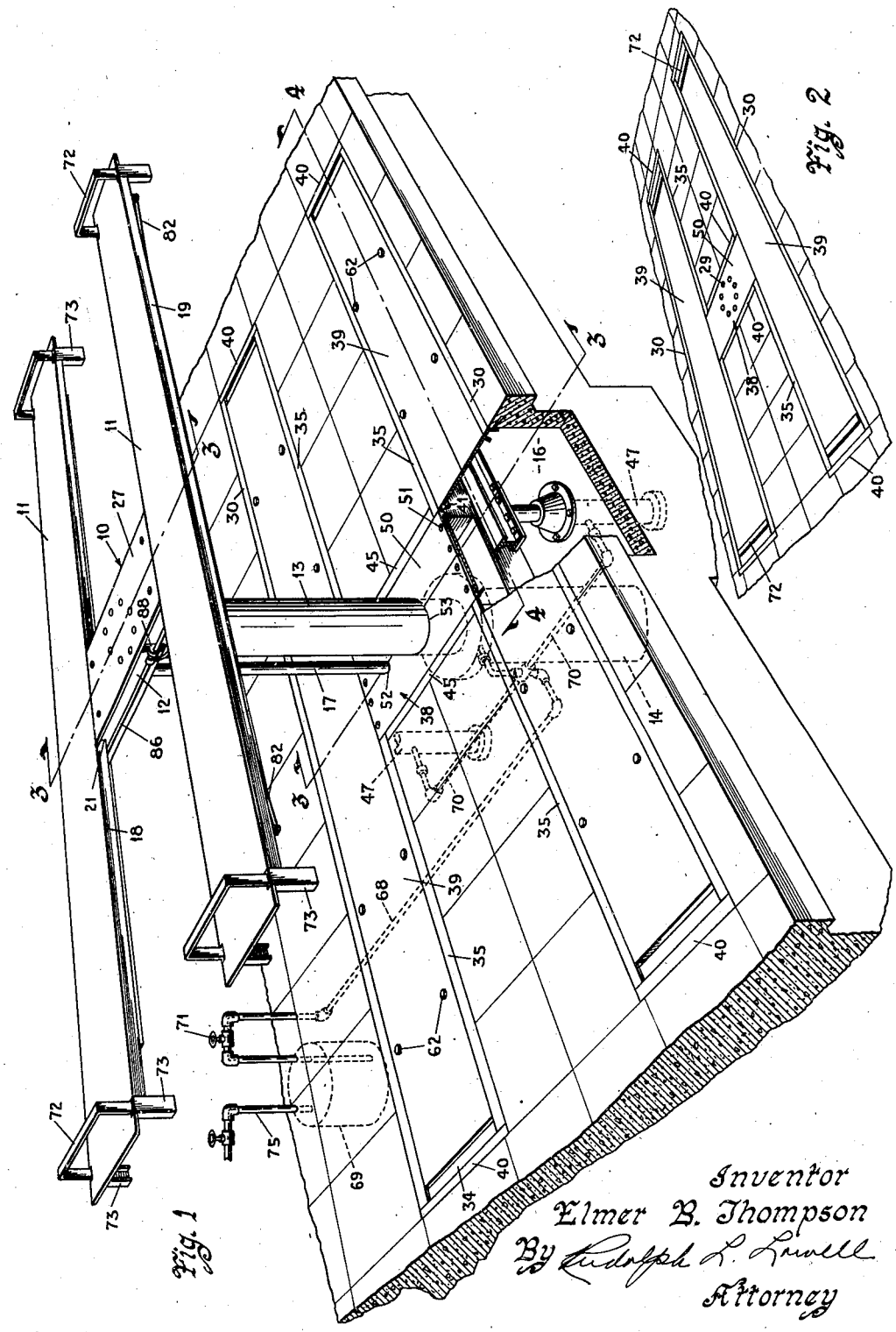
Fig. 1 is a perspective view of the vehicle hoist of this invention in a raised position and with certain parts broken away to more clearly show its construction.
Fig. 2 is a perspective view of the vehicle hoist in a lowered position level with the floor to provide for a normal use of the floor space occupied by the hoist.
Figures 3, 4:
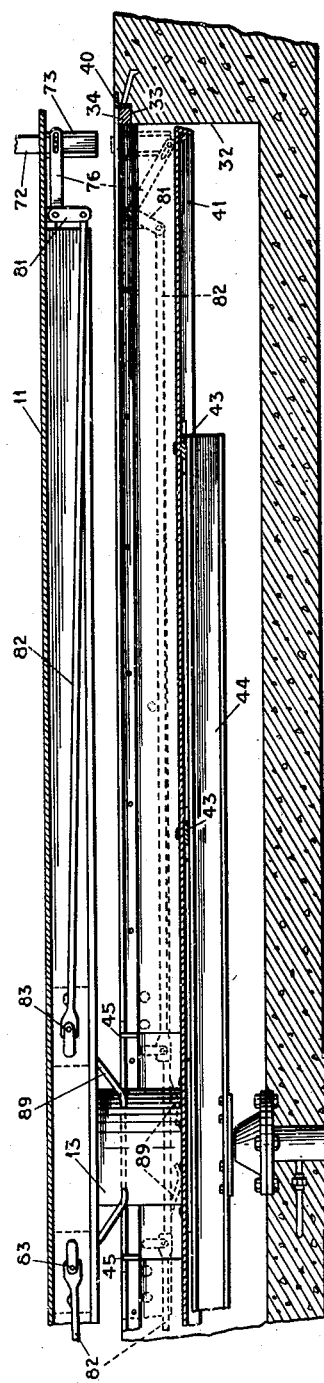
Fig. 3 is an enlarged transverse sectional view of the hoist in a raised position taken on the line 3—3 in Fig. 1.
Fig. 4 is an enlarged fragmentary longitudinal sectional view of the hoist in a raised position as seen along the line 4—4 in Fig. 1.

With reference to the drawings the hoist of this invention is illustrated in Figs. 1 and 3 as being of roll-on type and including a substantially H-shaped lift frame, designated generally as 10, and comprised of a pair of transversely spaced wheel rails 11 connected intermediate their ends by a transversely extended piston head unit or frame member 12 which is supported on a lift piston 13. The piston 13 is associated with a cylinder 14, mounted in a floor pit 16, and is held against rotational movement relative to the cylinder 14 by a usual guide device 17. The pit 16 is of an H shape corresponding in size to the lift frame 10 and is adapted to receive the lift frame in a lowered position of the hoist.

Since the wheel rails 11 are similar in construction and operation and similarly assembled with the piston head unit 12, only one of the wheel rails will be referred to in the following description.

A wheel rail 11 (Figs. 1 and 5) is of a flat form having downwardly and inwardly extended flanges 18 and 19 along its sides to facilitate the reception of the wheel rail within its corresponding pit opening. The flanges 18 and 19 terminate short of the ends of the wheel rail for a purpose which will appear later. The flange 18 is cut away over the central portion of the rail 11, as indicated at 21 in Figs. 1 and 5, to receive an end portion of the piston head unit 12. Welded to the under side of the rail 11 is a longitudinal frame member 22 of an inverted T shape (Figs. 3 and 5). The end of the piston head unit 12 is provided with lateral extensions 23 adapted to be secured, as by bolts 24, to the leg of the inverted T member 22. It is seen, therefore, that the inner central portion of the rail 11 overlies the head unit 12, which has its end positioned against the leg of the inverted T member between the under side of the rail 11 and the arm 26 of the inverted T member.

By virtue of the rail 11 being positioned on the head unit 12, a stepdown or depression, is formed on the head unit between the inner sides of the rails 11, of a depth equal to the thickness of the rails. To provide for the top surface of the H shaped lift frame 10 being substantially smooth and in a common plane a plate member 27 (Fig. 5), corresponding in thickness to the wheel rails 11, is positioned on the head unit 12 between the rails and secured to the head unit by countersunk screws 28. The plate member 27 is formed with openings to receive bolt heads 29 for the bolts which secure the head unit to the piston, whereby the bolt heads 29 are substantially within the plane in the top side of the H frame 10 (Figs. 3 and 5).

The top rim of the pit 16 is supported by angle iron members 30, 35 and 40. The angle members 30 and 35 (Figs. 1 and 3), along the sides of the pit openings for the rails 11 have one of their legs extended horizontally into the pit opening at positions level with the floor. The angle members 40 at the ends of the rail pit openings (Figs. 1 and 4) are spaced outwardly from the end wall 32 of the rail opening, with such space acting to form a step or shoulder 33 at each end of the rail pit openings. Supported on a shoulder 33 is a flat bar member 34 the top side of which is spaced below the level of the floor by a distance substantially equal to the thickness of the rail 11. When the hoist is lowered within the pit 16 the ends of the rails 11 are received in a supported position on the top of the bar members 34 whereby to limit the downward movement of the lift frame 10 to a position at which its top side is substantially level with the floor. It is thus seen, from a consideration of Fig. 2, that the floor space occupied by the hoist, in a lowered position, is free of any obstructions and capable of normal use without any interference by the hoist. The support of the rails 11 at its ends further rigidly supports the rails 11 against downward movement when an automobile to be elevated is driven thereon.

A closing of the pit 16, when the hoist is raised, is accomplished by the provision of means including a cover unit, designated generally as 38, and of an H shape corresponding in size to the lift frame 10. The cover unit 38 is located within the pit 16 and includes a pair of side cover members 39, underlying the wheel rails 11, and a transverse connecting member 50 underlying the head unit 12. The side cover members 39 are similar in their construction and assembly with the transverse cover member 50 so that only one thereof will be described in detail.

A side cover member 39 is of a flat form having a peripheral flange 41 extended downwardly and inwardly from its sides and ends (Figs. 3 and 4). Spaced longitudinally of the side cover members 39 and secured to its lower side are a plurality of transverse brace members 43, which in turn are carried on the top side of a longitudinal I beam 44. The I beam 44, intermediate its ends, rests on and is secured to the top of a lift piston 46 movable in a cylinder 47 which is mounted in the floor pit 16. The pistons 46, for the cover unit 38, are arranged at opposite sides of the lift piston 13 for the hoist, so that all three of the pistons 13 and 46 are in the same plane transversely of the hoist.

That portion of the flange 41 of a cover member 39, which extends along the inner edge of the side cover member 39, has a central longitudinally extended slot 55 (Fig. 9) for receiving a flat plate member 48, the inner end of which projects laterally from the side cover member 39. The plate member is positioned against the under side of the cover member 39 and is of a length substantially equal to the width of the pit opening for receiving the piston head unit 12.

Extended between the inner ends of the plate members 48 is the transverse connecting member 50, which is comprised of a pair of mating cover sections 49 secured to the plate members 48 by countersunk screws 51. The adjacent sides of the cover sections 49 are cut away at 52 and 53 (Figs. 1 and 9) to slidably receive therebetween the guide device 17 and the hoist lift piston 13, respectively. Because of the support of the cover sections 49 on the plate members 48 it is seen that the top side of the cover unit 38 is in a common plane. Further the attachment of the cover sections 49 to the plates 48 by the screws 51 provides for the ready removal of the sections 49 for easy and quick access to the piston head unit 12.

The movement upwardly of the cover unit 38 to a position level with the floor is limited by means including the angle members 30 and 35 at the sides of the rail pit openings (Figs. 6, 7 and 8). Cooperating with the angle members 30 and 35 are a plurality of stop members 61 adjustably supported on the side cover members 39 for movement into and out of engaging positions with the horizontal legs of the angle members 30 and 35. The stop members 61 are similar in construction and operation so only one of them will be described in detail.

A stop member 61 is mounted at its inner end on a square shank portion 60 of a bolt 62 which is rotatably extended through the side cover member 39, and through an end 63 of a brace member 43, which brace, as best appears in Fig. 7, is bent away from the under side of the cover member 39 and terminates inwardly from the cover member flange 41. The outer end of the stop member 61 is movable in a slot 64 formed in the flange 41 at a position oppositely from the brace end 63. A coil spring 66, mounted about the bolt 62 between the stop member 61 and the end 63 of the brace 43, acts to frictionally hold the stop 61 in an adjusted position against the under side of the cover member 39. Adjustment of the stop 61 is accomplished by merely applying a wrench to the head of bolt 62, which head projects upwardly from the top side of the cover member 39.

To stop the upward movement of the side cover members 39, and in turn of the cover unit 38, at a floor level position shown in full lines in Fig. 3, each stop member 61 is moved to its full line position shown in Fig. 8, it being understood that the stop members are arranged in pairs at opposite ends of a brace member 43. In this position the outer ends of the stop members 61 are engageable with the horizontal legs of the angle members 30 and 35.

In the event it is necessary to clean the floor pit 16, or to service the pistons 13 and 46, each stop 61 is movable to either of its dotted line positions shown in Fig. 10 at which their outer ends are out of positions for engaging the angle members 30 and 35. As a result the cover unit 38 is movable to a raised position, shown in Fig. 6, a distance above the level of the floor dependent upon the length of the piston 46 whereby the pit 16 is completely open. Referring to Fig. 8 it is seen that a stop member 61, in a dotted line position, is engageable with an end 67 of the slot 64. Pivotal movement of a stop 61, therefore, is limited by its engagement with a slot end 67 whereby to facilitate its actuation into and out of an engaging position with an angle member 30 and 35.

In the operation of the hoist assume the hoist to be in its lowered position shown in Fig. 2, with each stop 61 in its full line position shown in Fig. 8. An automobile is then driven on the rails and the hoist operated, in a usual manner, by the application of air under pressure to a fluid or oil in the tank 69 to hydraulically raise the piston 13 and in turn the lift frame 10. Oil under pressure is supplied to the cylinder 14 through an oil line 68 (Fig. 1) connected with a suitable source of oil pressure, each as a buried oil tank 69. The supply of oil to the cylinder 14 is controlled by a valve 71 connected in the line 68. The tank 69 is connected through a pipe 75 with an air compressor or the like (not shown).

The cylinders 47 for raising and lowering the cover unit 38 are connected with the oil pipe 68 through pipes 70. Thus on an application of an oil pressure to the cylinder 14 oil under pressure is concurrently supplied to the cylinders 47 so that the cover unit 38 and the lift frame 10 are raised together. By virtue of this concurrent operation of the cover unit 38 and the lift frame 10, the cover unit is elevated to a stop position level with the floor as the rails 11 are moved out of their respective pit openings and away from their floor level positions. The pit 16, therefore, is closed by the cover unit 38 at substantially the same time that the lift frame is moved out of its covering position relative to the pit 16. This is accomplished by virtue of the fact that the cover unit 38 is of a lighter weight than the lift frame 10 and the fluid pressure for raising and lowering the unit 38 and lift frame 10 is the same, namely, the pressure of the fluid in the line 68. In use, the weight of the lift frame 10 is further increased by the weight of the vehicle being elevated. As a result, the cover unit 38 is raised more rapidly than the lift frame 10, and engages the underside of the lift frame 10, whereby the unit 38 and the lift frame 10 move upwardly together to a floor level position for the unit 38. The pit 16 is thus closed by the unit 38 as soon as the lift frame 10 is raised out of the pit 16.

When the hoist is lowered the oil supply to the cylinders 14 and 47 is discontinued at the same time, by actuation of the valve 71, so that the cover unit 38 and the lift frame 10 are lowered together. This lowering of the cover unit and the lift frame continues until the cover unit is located within the pit 16, and the wheel rails 11 are in their stop positions level with the floor because of the greater weight of the lift frame 10, the cover unit 38 remains in a pit closing position until it is engaged and moved into the pit by the descending lift frame. Thus, as clearly appears from a consideration of Figs. 1 and 2, the pit 16 is closed by the cover unit 38 when the hoist is in any elevated position out of the pit, and by the lift frame 10 when the hoist is in its lowered position. The floor space occupied by the hoist is thus completely available for normal use regardless of whether the hoist is in a lowered position or a raised position.

In order to maintain an automobile against movement off from the rails 11, wheel stops are provided at the end of each wheel rail (Figs. 10 and 11). Each stop includes a substantially inverted U-shaped stop member 72, the legs of which are slidably supported in a pair of guides 73 arranged at opposite sides of a wheel rail. When a stop member 72 is in its lowered position it lies flat against the top of a wheel rail 11, and, in an elevated position, stands across the wheel rail at an elevation which prevents an automobile wheel from passing over it.

Supported from the under side of a rail 11 is a shaft 74 having two crank arms 76 provided with slots 77. A rod 78, connected between the lower ends of the legs of a stop member 72, extends through the slots 77. By this arrangement, when the shaft 74 is rotated to one position the wheel stop 72 is moved flat upon the top of a wheel rail, and when the shaft 74 is rotated to a second position a wheel stop 72 is moved by the crank arms 76 and the rods 78 to an elevated position. Mounted about the shaft 74 is a torsion spring 79 arranged to normally hold the shaft 74 in a position for elevating the wheel stop 72.

The shaft 74 carries a pair of axially spaced crank arms 81 having their free ends pivoted to one end of a rod 82, the opposite end of which rod is pivoted at 83 to a crank arm 84 carried on a shaft 86 rotatably extended through the members 22 and 23 and rotatably supported in a bracket 88 carried on the head unit 12. A second crank arm 89 on the shaft 86 extends downwardly to a position such that when the hoist is in its lowered position the free end of the crank arm engages the top side of connecting member 50 of the cover unit 38 and moves the crank arm to a substantially horizontal position, as indicated in dotted lines in Fig. 4. When the hoist is lowered the engagement of the cranks 89 against the cover unit 38 moves the stop members 72 to positions flat against the rails 11. Concurrently with the raising of the hoist, the stops 72 are moved to their wheel engaging position by the action of the torsion spring 79. With the hoist in its lowered position the brackets 88 and 86 are received in the transverse pit opening and covered by the side portions of the plate member 27, which portions, as illustrated in Figs. 1 and 5, extend beyond the sides of the piston head unit 12. For a more detailed description of the construction and operation of the wheel stop devices reference is made to Patent 2,066,916.

From a consideration of the above description it is seen that the invention provides a hoist of roll-on type adapted to be mounted in a floor pit, and provided with means for maintaining the pit closed at all positions of the hoist whereby the floor space occupied by the hoist is adapted for normal use at all times. Although the invention has been described with respect to a preferred embodiment thereof it is to be understood that it is not to be so limited since changes and modifications can be made which are within the full intended scope of this invention as defined by the appended claims.

I claim:

1. In a vehicle hoist including a pair of transversely spaced wheel rails adapted to be moved within a floor pit to a lowered position level with the floor and in a covering position relative to the floor pit, first piston means for raising and lowering said wheel rails, means for closing said floor pit when the wheel rails are in a raised position including cover plates located within said floor pit and movable to raised positions level with the floor, second piston means for lowering and raising said cover plates, with said cover plates being of a lighter weight than said wheel rails, common means for supplying fluid under pressure to said first and second pistons, and means for concurrently controlling the supply of fluid under pressure to said first and second piston means, whereby said cover plates engage the lift frame on their upward movement to a floor level position, and are engaged and moved downwardly with said lift frame out of their floor level position.

2. In a vehicle hoist of roll-on type including a pair of wheel rails, a lift piston between said wheel rails, and a transverse frame unit mounted on said lift piston and connected between said wheel rails, with said wheel rails and frame unit being adapted to be moved within a floor pit to a lowered position at which the top sides of said frame unit and the wheel rails are substantially level with the floor and in a covering relation with the floor pit, means for covering the floor pit when the hoist is in a raised position comprising a cover unit mounted within the floor pit for up and down movement and including side cover members corresponding in size and shape to the wheel rails and an intermediate member connected between said side members corresponding in size and shape to said frame unit, said intermediate member having an opening therein for loosely receiving said lift piston, said cover unit being movable to a raised position level with the floor and to a lowered position within the pit, a pair of lift pistons arranged within said pit at opposite ends of said intermediate member, means for mounting said cover unit on said lift pistons, and means for concurrently operating said cover unit lift pistons and said hoist lift piston to provide for said cover unit and hoist being lowered and raised together.

3. In a vehicle hoist of roll-on type comprising a substantially H-shaped lift frame and a lift means therefor mounted in a floor pit for movement to a lowered position within the floor pit and adapted to cover the pit in said lowered position, stop means for limiting the downward movement of the lift frame at said floor level position, means for covering the floor pit when the lift frame is in a raised position including an H-shaped cover unit located in the floor pit and movable up and down therein to a lowered position below the level of the floor, and to a raised position level with the floor, coacting stop portions on said cover unit and on certain walls of the floor pit adapted for engagement to limit the upward movement of the cover unit to the floor level position therefor, lift means for said cover unit located within said pit, and means for operating the lift means for said lift frame and the lift means for said cover unit so that said lift frame and said cover unit are raised and lowered together.

4. In a vehicle hoist, a lift unit mounted in a floor pit and movable within the pit to a lowered position at which the top surface of the lift unit is substantially level with the floor, and adapted to cover the pit, means for limiting the downward movement of said lift unit at said floor level position, means for covering the pit when the lifting unit is in a raised position including a cover unit mounted in the pit for up and down movement to a lowered position below the level of the floor, and to a raised position substantially level with the floor, coacting stop portions on said cover unit and on certain walls of the pit adapted for engagement to limit the upward movement of the cover unit to its floor level position, means for raising and lowering said lift unit and said cover unit so that the cover unit is moved to its floor level position as said lift unit is raised, and to its lowered position within the pit when the lift unit is lowered to a pit covering position, and means for moving certain of said stop portions out of their stop positions to provide for the movement of said cover unit to a raised position above the level of the floor.

5. In a vehicle hoist including a lift frame movable within a floor pit to a lowered position level with the floor, and adapted to close the floor pit in said lowered position, means for closing the floor pit when said lift frame is in a raised position out of said pit, including a cover unit located in the floor pit and movable to a raised position level with the floor, fluid actuated means for raising and lowering said lift frame and cover unit, a common source of fluid pressure, and a single means for controlling the supply of fluid from said common source to said fluid actuated means whereby said cover unit engages said lift frame for upward movement with the lift frame out of said pit to a floor level position and is engaged by said lift frame at said floor level position for downward movement with the lift frame into said pit, and means for stopping the upward movement of said cover unit at a floor level position therefor.

ELMER B. THOMPSON.

REFERENCES CITED

The following references are of record in the file of this patent:

UNITED STATES PATENTS

| Number | Name | Date |
|---|---|---|
| 2,066,916 | Thompson | Jan. 5, 1937 |
| 2,100,617 | Thompson | Nov. 30, 1937 |
| 2,107,210 | Palm | Feb. 1, 1938 |